(12) United States Patent
Singer

(10) Patent No.: US 7,742,962 B1
(45) Date of Patent: Jun. 22, 2010

(54) SYSTEM AND METHOD FOR COALESCING MARKET DATA AT A CLIENT DEVICE

(75) Inventor: Scott F. Singer, Lake Bluff, IL (US)

(73) Assignee: Trading Technologies International Inc., Chicago, IL (US)

( * ) Notice: Subject to any disclaimer, the term of this patent is extended or adjusted under 35 U.S.C. 154(b) by 269 days.

(21) Appl. No.: 11/416,405

(22) Filed: May 2, 2006

Related U.S. Application Data

(63) Continuation of application No. 10/184,498, filed on Jun. 26, 2002, now Pat. No. 7,552,077.

(51) Int. Cl.
*G06Q 40/00* (2006.01)

(52) U.S. Cl. ............................. 705/35; 705/36; 705/37; 707/217; 345/415; 709/203; 709/217; 709/219; 340/10.1; 715/762; 370/326

(58) Field of Classification Search ............. 705/35–37; 709/219, 203, 217; 707/217; 345/418; 340/10.31; 715/762; 370/326
See application file for complete search history.

(56) References Cited

U.S. PATENT DOCUMENTS

| | | | | |
|---|---|---|---|---|
| 3,253,263 A | * | 5/1966 | Lee et al. ................. | 369/29.01 |
| 5,339,392 A | * | 8/1994 | Risberg et al. .............. | 715/762 |
| 5,905,868 A | * | 5/1999 | Baghai et al. ............... | 709/224 |
| 5,995,980 A | | 11/1999 | Olson et al. | |
| 6,006,206 A | * | 12/1999 | Smith et al. .................... | 705/35 |
| 6,058,389 A | | 5/2000 | Chandra et al. | |
| 6,370,569 B1 | * | 4/2002 | Austin ........................ | 709/217 |
| 6,516,339 B1 | * | 2/2003 | Potts et al. .................. | 709/203 |
| 7,212,997 B1 | | 5/2007 | Pine et al | |
| 2002/0120546 A1 | * | 8/2002 | Zajac .......................... | 705/37 |
| 2002/0184237 A1 | | 12/2002 | McFeely | |
| 2004/0162772 A1 | | 8/2004 | Lewis | |

FOREIGN PATENT DOCUMENTS

WO    WO02/17193 A1    2/2002

* cited by examiner

*Primary Examiner*—Harish T. Dass
(74) *Attorney, Agent, or Firm*—McDonnell Boehnen Hulbert & Berghoff LLP

(57) ABSTRACT

A client device coalesces data received from an exchange, and provides a client application such as a graphical user interface with the opportunity to process fewer, but up-to-date, data updates from an exchange when a large volume of prices becomes available. Accordingly, the trader can be assured of receiving updated information that are fed to the client applications at a rate that is cohesive with that client device's processing speed.

18 Claims, 2 Drawing Sheets

SYSTEM AND METHOD FOR COALESCING MARKET DATA AT A CLIENT DEVICE

CROSS REFERENCE TO RELATED APPLICATION

This application is a continuation of U.S. patent application Ser. No. 10/184,498 filed Jun. 26, 2002, entitled "System and Method for Coalescing Market Data in a Network Device" the contents of which are fully incorporated herein by reference.

FIELD OF THE INVENTION

The present invention is generally directed to coalescing data at a client device, and in particular, manages time-sensitive communication received from a network device and/or exchange.

BACKGROUND

Trading methods have evolved from a manually intensive process to a technology enabled, electronic platform. Advances in technology are having an increasingly large and broad impact on trading and the way in which exchanges conduct business. What was previously seen as just a supplement to the traditional pit trading, electronic trading platforms continue to increase in importance and popularity. The advent of electronic trading has meant that a customer can be in virtually direct contact with the market, from practically anywhere in the world, performing near real-time transactions, and without the need to make personal contact with a broker. Electronic trading systems are also convenient for floor brokers on the floor at an exchange for receiving orders electronically.

As a result, the number of market participants continues to increase as does market volatility. Such an increase in the number of market participants may result in more competitive prices, while also contributing to the liquidity of the market. However, potential complications may also result. One such complication may be that updates of market data (e.g., price updates, order updates, or fill updates) occur more frequently than can be processed by the software systems monitoring those market data updates.

Consider the following illustration whereby a client subscribes to price updates on Microsoft stock (MSFT). Assume that at a certain point in time the volume in the MSFT market becomes increasingly large and price updates start flowing at a rate that is beyond what can be delivered to the client. Most client devices have an internal message queue, which is an ordered list of messages, from which they are taken up on a first in, first out (FIFO) basis by applications running on the device. However, as a result of the increasing flow of price updates, the internal message queue for the client will continue to grow until the market's volume burst subsides (if it does subside). Because the queue will be growing, and the messaging system is obligated to deliver all of the messages in the queue, the slow client will begin to display price updates that are increasingly outdated.

In some circumstances like the example given above, the trader will be trading on the basis of old information, which is unacceptable and can have disastrous results. In other circumstances, the internal message queue will backup until ultimately there is a failure (i.e. overflow) that typically results in the most recent prices being dropped altogether, which is also unacceptable and eventually prevents the trader from actively participating in the electronic market altogether.

To avoid some of these problems, a trader might purchase a high-end computer with a fast processor(s) to perform billions of operations in a matter of seconds. Usually, but not all of the time, having an increase in processor power might reduce some the issues associated with queue buildup. However, even a computer with the fastest processor(s) can still encounter similar problems because the processor time may be used in processing information associated with other tasks. Thus, other applications, such as a graphical user interface, are prevented from performing their operations on the incoming price updates. Therefore, having a faster computer will not always result in the optimum solution.

DETAILED DESCRIPTION

A need in the art is addressed by providing a system and related methods for coalescing time sensitive information by managing market data updates at a client device residing within an electronic trading environment. A system and related methods for coalescing time-sensitive market data at a network device other than a client device is described in U.S. patent application Ser. No. 10/183,845, contemporaneously filed on Jun. 26, 2002, entitled "A System and Method for Data Coalescing at a Network Device," now U.S. Pat. No. 7,552,077, the contents of which are incorporated herein by reference.

According to the preferred embodiment, an exchange sends market data to a client device. Software hosted in the client device coalesces the market data so that client applications such as a graphical user interface (GUI) can process fewer market data updates. For example, assume that a client device has received four market updates simultaneously or near simultaneously from an exchange. Rather than queuing all four market updates and processing them individually as found in prior art solutions, the GUI and/or other client applications can simply handle one market update, because according to a preferred embodiment, the four market updates would be coalesced.

According to the example above, the required processor time would be dramatically reduced because it only has to processes one market update versus four market updates. Moreover, the GUI could perform other tasks, such as respond to input devices or perform calculations, because it was also freed up by handling fewer market updates. Furthermore, using prior art solutions, by the time the GUI handles the fourth update (or any update) it may already be old information, whereas using the teachings described herein, the one coalesced market update provides the GUI or other client applications with the most current market information.

While the present invention is described herein with reference to illustrative embodiments for particular applications, it should be understood that the invention is not limited thereto. Those having ordinary skill in the art and access to the teachings provided herein will recognize additional modification, applications, and embodiments within the scope thereof would be of significant utility.

Illustrative embodiments and example applications will now be described with reference to the accompanying figures to disclose advantageous teachings of a preferred embodiment of the present invention.

Figure 1:
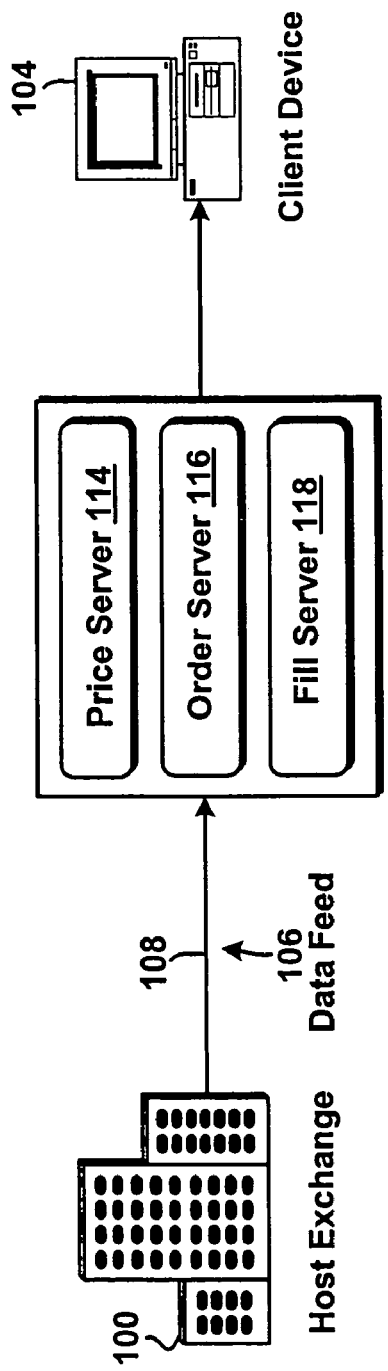
FIG. 1 shows an example host exchange, gateway, and client device that implements data coalescing in accordance with a preferred embodiment.

FIG. 1 shows an example host exchange, gateway, and client device that implements data coalescing in accordance with a preferred embodiment. In the preferred embodiment, the system generally includes a host exchange 100, a gateway 102, and a client device 104. Preferably, the system can support up to N host exchanges and corresponding N gateways 102, and N client devices (although N host exchanges, N gateways, and N client devices are not shown for sake of clarity), where N represents any number. Other host exchanges 100 include an Electronic Communication Network (ECN) like Island, which is a well-known electronic trading facility. Another host exchange might include the Chicago Mercantile Exchange (CME), the Xetra (a German stock exchange), and the European derivatives market (Eurex). As known in the art, the gateway 102 is one or more computers (or program(s)) running software that receives information from the host exchange in the form of price information, order information, and fill information. Also known in the art, the client device 104 is a computer that receives one or more data feeds from the gateway 102. The host exchanges 100, gateways 102, and client device 104 are explained below in their respective sections.

It should be understood that the present invention is not limited to any particular network architecture, but rather may be applied with utility on any electronic device in any network that can be used for electronic trading. Furthermore, the invention is not limited to a completely electronic trading environment where orders are sent to an electronic matching engine. For example, the invention could be utilized with an electronic trading application that sends orders electronically to a terminal where a person (e.g., a floor broker) executes those orders in a traditional open outcry trading floor.

Host Exchange

Each host exchange 100 provides different types of information, and relays this information, or a portion thereof, collectively referred to as a data feed, over a network to market participants or traders. A data feed from one exchange may contain different information representing different tradeable objects than another data feed from a second exchange. However, it is not necessary in the preferred embodiment that the data feeds from exchanges can include the same data or different data.

As used herein, the term "tradeable objects" refers simply to anything that can be traded with a quantity and/or price. It includes, but is not limited to, all types of tradeable objects such as financial products, which can include, for example, stocks, options, bonds, futures, currency, and warrants, as well as funds, derivatives and collections of the foregoing, and all types of commodities, such as grains, energy, and metals. The tradeable object may be "real", such as products that are listed by an exchange for trading, or "synthetic", such as a combination of real products that is created by the user.

In general, a data feed 106 may include information representing prices and quantities for a tradeable object. For example, the data feed 106 could include data corresponding to a price and/or quantity at the inside market and/or data corresponding to a price and quantity in the market depth. The inside market includes data corresponding to a tradeable object including the highest bid price with quantity and the lowest ask price with quantity. Data feeds 106 from some exchanges also include data corresponding to the market depth. Market depth is represented by the available order book, including the current bid and ask quantities and their associated prices. In other words, subject to the limits noted below, market depth is each available pending bid and ask quantity, entered at a particular price, in addition to the "inside market." The data feed 106 can contain other types of market information such as the last traded price (LTP), the last traded quantity (LTQ), order information, and/or fill information. The information in a data feed 106, whether it contains the inside market and/or market depth or more market information, is generally categorized into three groups referred to as price, order, and fill information.

In a one embodiment, each host exchange 100 sends a data feed 106 to a gateway 102. The data feed 106 preferably carries all of the information that the exchange 100 provides, such as price, order, and fill information, and alternatively may include more information. The host exchange 100 may send its data feed 106 to the gateway 102 over a dedicated line 108, which is a communications channel that permanently connects the exchange to the gateway. Dedicated lines may be private or leased lines such as T1 lines, which are known by those skilled in the art. Or alternatively, the host may send its data feed to the gateway over a switched network such as a wide area network (WAN), legacy networks that utilize X25 protocol or also IBM LU6.2 SNA protocol, satellite broadcast systems that use leased satellite channels to broadcast price data, or a packet switched network such as ATM or Frame relay, which are both connection methods know by one skilled in the art.

According to the embodiment above, if there were five exchanges, then each exchange would have a gateway, and then according to this example there would be five gateways. When a trader wants to participate in the market at two of the five exchanges, he or she can subscribe only to the data feeds that correspond to those two exchanges. If the trader decides to drop one of the exchanges or add another exchange, he or she may preferably do so at any time.

In another embodiment, each host exchange sends a data feed to a single gateway. For example, if there were five exchanges, then each exchange would send its data to the single gateway. Then, when a trader wants to participate at two of the five exchanges, he or she can simply subscribe to the data feeds that correspond to those two exchanges at the gateway. Also, if the trader decides to drop one of the exchanges or add another exchange, he or she may do so at any time.

In yet another embodiment, some exchanges may have multiple gateways, so that if there were five exchanges, then there might be three gateways supporting each of them; for fifteen gateways. This embodiment allows for a load balancing, among other benefits, of the gateways' workstations.

Gateway

As mentioned earlier, the gateway 102 is a computer (or program) that receives information from the host exchange. As used herein, a computer includes any device with memory and a processor capable of processing information to produce a desired result. Thus, a gateway can be a computer of any size such as a server, workstation, personal computer, or laptop, but generally, the gateway is any computer device that has the processing capability to perform the function described herein. Moreover, it should be understood that the functions of the gateway could be moved to the exchange and/or the client device to reduce or eliminate the need for a gateway.

In one embodiment, the gateway 102 receives a data feed 106 from an exchange 100. Preferably, the gateway 102 receives the data feed 106 and converts it to a form compatible with the protocols used by the client device 104 using conversion techniques known in the art. As known by those skilled in the art, the gateway 102 may have one or more servers to support the data feeds, such as a price server 114 for processing price information, an order server 116 for processing order information, and a fill server 118 for processing fill information. Generally, a server is a computer or program that responds to commands from a client in the form of subscriptions. The "servers" here may run on the same machine or may run on independent machines. A trader at a client device can subscribe to price information, order information, and fill information for that exchange. Once a client device has subscribed to the information, the gateway 102 publishes the information to the client device 104.

Client Device

As mentioned before, the client device 104 is a computer that allows a trader to participate in the market hosted at the exchange. In general, it uses software that creates specialized interactive trading screens on the client device's terminal. The trading screens enable traders to enter and execute orders, obtain market quotes, and monitor positions. The range and quality of features available to the trader on his or her screens varies according to the specific software application being run. In addition to or in place of the interactive trading screens, the client device may run automated non-interactive types of trading applications.

A commercially available trading application that allows a user to trade in a system like that shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static price scale. The preferred embodiments, however, are not limited to any particular product that performs the translation, storage and/or display functions. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, and U.S. patent application Ser. No. 09/971,087, entitled "Click Based Trading With Intuitive Grid Display Of Market Depth And Price Consolidation," filed on Oct. 5, 2001, the contents of both are incorporated by reference herein. Moreover, the trading application may implement tools for trading tradeable objects that are described in a U.S. patent application Ser. No. 10/125,894 filed on Apr. 19, 2002, entitled "Trading Tools for Electronic Trading," the contents of which are incorporated by reference.

Data Coalescing

Figure 2:
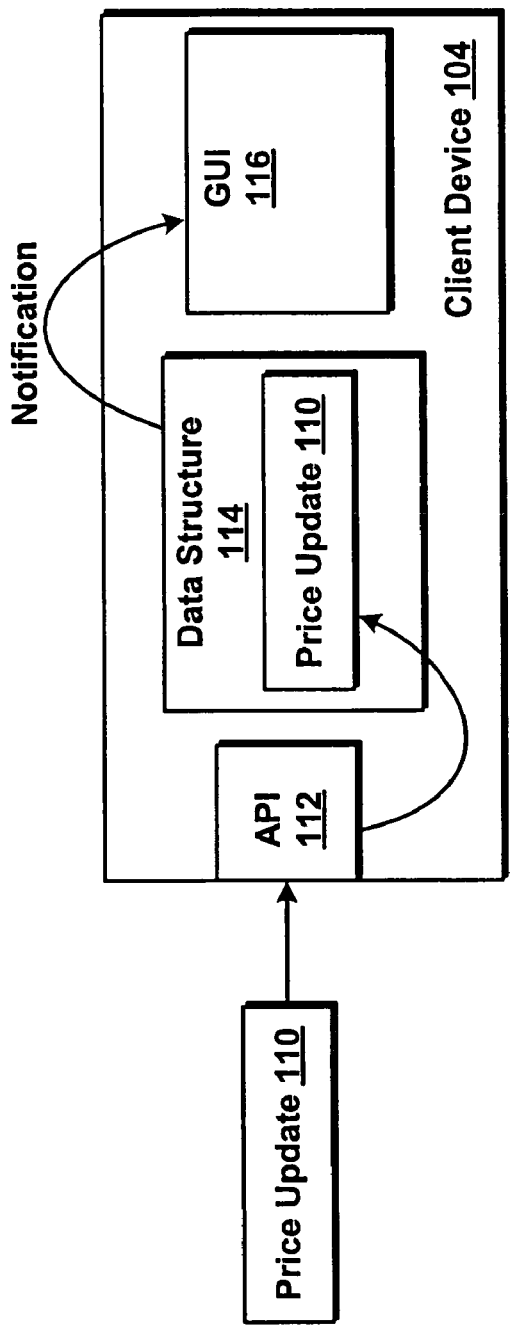
FIG. 2 shows an example data flow illustrating a relationship between a price update, client API, and data structure.

FIG. 2 shows an example data flow illustrating a relationship between a price update, API (applications programming interface), and data structure. In a preferred embodiment, the API 112 and GUI 116 are threads of a trading application such as X_TRADER® from Trading Technologies International, Inc. of Chicago, Ill. Alternatively, the API, the GUI, or both the API and GUI may be separate software applications from the trading application. It should also be understood that the present invention is not limited by the elements shown in FIG. 2. For example, the functions described herein can be accomplished using more or fewer threads and/or different threads; the API thread might instead be a communication thread, and another client application (e.g., trading application) may be used instead of the GUI.

The example data flow in FIG. 2 is assuming that the incoming market data feed could include of a price update indicating that a price update has occurred in the market. In one embodiment, a price update is a message sent from the exchange that contains the current best bid price and/or best ask price (i.e., the inside market) for a tradeable object. In another embodiment, a price update is a message that contains the entire set of bid prices and/or ask prices currently in the market. Of course, a price update can mean many different things besides those described above, depending on the type of tradeable object, how the exchange defines it, and/or how the programmer defines it. It should be understood that other types of updates might occur instead of price updates. For example, order updates and/or fill updates may also occur, where an order update is a message that contains the working orders that have been placed into the market, and where a fill update is a message that contains information indicating when a working order has been filled. Again, other types of updates may occur, and the present invention is not limited to the type of update. Moreover, other items of interest may be delivered to the client device 104 instead of price, order, and fill updates, such information might include the Last Traded Price (LTP), Last Traded Quantity (LTQ), Best Bid Quantity, and/or Settlement Price.

Figure 4:
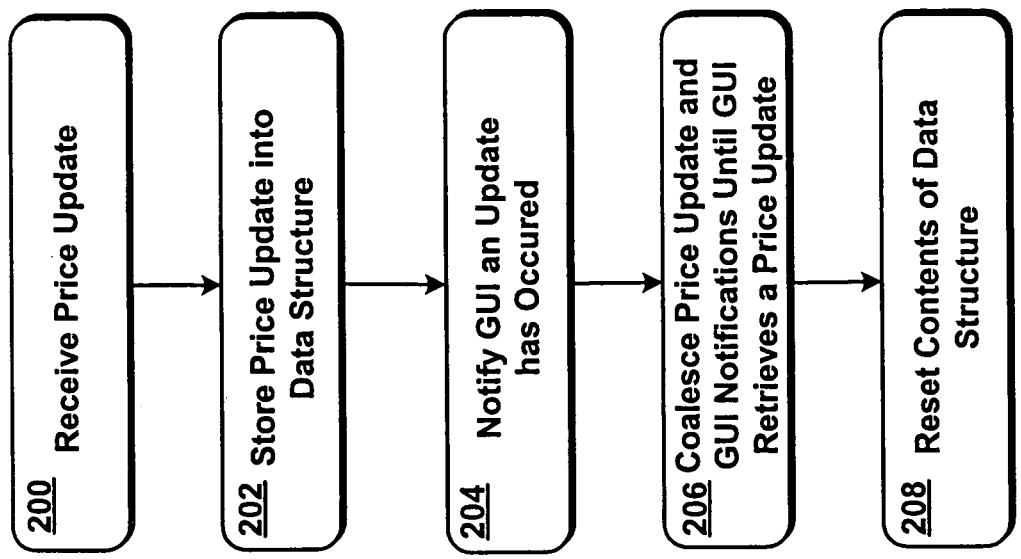
FIG. 4 shows a flowchart of data coalescing in accordance with a preferred embodiment.

Turning briefly to FIG. 4, a flowchart shows an example method of data coalescing at the client device 104. The flowchart shows example steps that can be taken to coalesce information received from an exchange, and in this particular example price updates, at the client device 104. Each step of the flowchart is described below with respect to FIGS. 2 and 3. It should be understood that the flowchart provides only an illustrative description of market information coalescing, and that more or fewer steps may be included in the flowchart, and/or steps may occur in one or more orders which are different from the order of steps shown in FIG. 4. For example, step 206 may not need to occur at all, for example, so long as the GUI can respond to the update message quicker than the next update arrives all updates are processed and no coalescing occurs.

Referring to the flowchart in FIG. 4, in step 200, client device 104 via API 112 receives a price update from a gateway/exchange. As known by one skilled in the art, when the exchange delivers price updates to the client device 104 it is received by API 112. The exchange may deliver price updates upon request from the client device 104, or alternatively, the exchange may continuously deliver price updates to the client device 104 regardless of whether there was a request made by the client device 104. Updates are preferably for a specific tradeable object or contract.

In the preferred embodiment, when an update occurs, the market data included in the update is stored in a data structure 114. The API 112 and the GUI 116 preferably share the data structure 114. The data structure 114 may be a record or a collection, such as an array, that stores market data into one or more fields. According to one embodiment, the data structure has at least one field that stores price information such as price update 110. For purposes of illustration, assume that price update 110 is an update to the inside market, that is, it contains the best bid price and/or best ask price for tradeable object "ABC." As mentioned before, the update can include other items of interest such as price updates for the market depth, LTP, LTQ, and so on.

In step 202, the market data is stored (temporarily or otherwise). Using the example with price update 110, if there was no previous price information in data structure 114 for "ABC", and in particular, there was no inside market price updates, then price update 110 is stored into data structure 114. If there was an existing or previous price update value for the same information already in data structure 114, that data is coalesced, that is in one embodiment, the old price update is replaced by the new price update 110. For example, assume that a first market update had only a bid price of five for ABC, and a second market update had a new bid price of seven for ABC, then the coalesced bid price for ABC would be seven.

Moreover, coalescing may also include combining market information with other related market information for the same tradeable object. For example, assume that a first market update had only a new bid price of four for "ABC." This update is put into the data structure 114. Then, if there is a second market update with only a new ask price of six for "ABC;" the data is coalesced by adding the second market update to the data structure 114 (so that the data structure contains a bid price=4 and an ask price=6 for "ABC"). If a third market update has a new bid price of three and last traded quantity (LTQ) of ten both for "ABC," then the new bid price will replace the old bid price in the data structure 114 (3 replaces 4), and the LTP of four is added to the data structure 114. At this point, the data structure would contain a bid price of 3 (from the third market update), an ask price of 6 (from the second market update), and a LTP of 4 (from the third market update). This example assumes the market updates for one tradeable object, but market updates may occur for more than one object, in which the market updates for the other tradeable objects are coalesced and stored in a similar fashion.

In step 204, the GUI is notified that an update in the data structure 114 has occurred if there is not already a pending notification. The GUI may be notified in a variety of ways. One way to notify the GUI is to send a message indicating that an update has occurred. The message may be put into a message queue that provides a list of items for the GUI to perform. For example, a message queue might have the following items in it: mouse move right, mouse left-button click, update notification, . . . , keyboard input, etc. Then, according to this example, when the GUI comes to update notification in the message queue, it will retrieve the update from the data structure at that time, if programmed to do so. Another way to notify the GUI is to set a flag bit to one (or zero, however it is programmed) to indicate that an update is available in the data structure. The flag bit may also be used in combination with the message queue notification. Other ways known by one skilled in the art can be used to notifying the GUI that an update has occurred.

Note, however, that according to the preferred embodiment, the GUI is not notified that an update in the data structure 114 has occurred if there is a pending notification. To illustrate, the methods of notification described above are used in an example. For example, if an update notification was already in the message queue, another update notification will not be put into the queue. Instead, the market data for the second update is coalesced with the market data for the first update, such as described above with respect to step 202.

Using the example with price update 110, if there is no pending notification to the GUI that the price update 110 (or any previous price update to price update 110) is available, the GUI will be notified by using one of the techniques described above (or any other technique). The notification tells the GUI that a price update is available in data structure 114. If there is a pending notification indicating that an update message has been sent to the GUI, another notification message will preferably not be sent. A pending notification may exist if a previous market update has already been stored into data structure 114 and the GUI has been notified of the update (e.g., in a message queue or through a flag bit).

In step 206, market data and GUI notifications are coalesced until the GUI retrieves the update and resets the contents of the data structure per step 208. Using the example above, price information may continue to be sent from the exchange to the client device while the GUI is in the process of retrieving the price update value(s) stored in the data structure 114. Because the price information is continually coalesced in the data structure after the notification of an update, the GUI will retrieve the most recent market update information.

In one embodiment, the GUI may also implement an artificial delay in handling a notification, which would provide for user configurable, or auto-tuning, of an overall duty cycle of update processing. For example, the GUI may decide to only process updates at most once per second. According to this example, an update might have occurred, but GUI will not process it until one second has passed since the last time it processed a message like this. This might be useful as a quality-of-service feature, or it could be used to artificially induce maximum update performance in order to differentiate a high-end product from a low-end product.

Preferably, notifications may also be coalesced and/or deleted if a pending notification exists. For example, if an inside market price update comes in after price update 110 and the GUI has already been notified about price update 110 (but hasn't yet retrieved it, as in steps 206/208), an update notification will not be sent to the GUI thread.

Preferably, step 206 will repeat until the GUI handles the notification and retrieves the coalesced price update information from the data structure 114. Preferably, this action also causes the pending GUI 116 notification to be cleared such as setting a flag bit to zero. Then, when a new price update is stored into the data structure 114, a notification message will be sent to the GUI 116, effectively restarting the coalescing procedure. At step 208, the data structure 114 is cleared.

Figure 3:
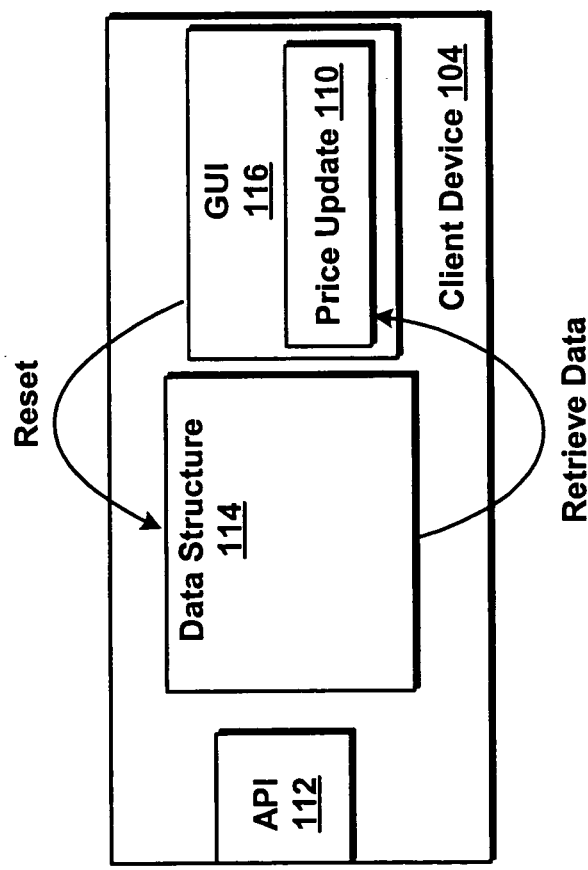
FIG. 3 shows an example data flow illustrating a relationship between a price update, data structure, and GUI.

FIG. 3 shows an example data flow illustrating a relationship between a price update, data structure, and GUI. When the GUI 116 is notified that price update 110 has been received and stored into data structure 114, it is notified. The GUI handles the notification by retrieving one or more data structures and clearing the contents of the data structure and any pending GM notifications. When the next price update comes to client device 104, the process steps 200-208 preferably repeat.

According to the preferred embodiment, as long as the GUI 116 can respond to the price update quicker than when the next price update arrives, all updates are processed by the GUI 116 and no coalescing occurs in data structure 114. In the situation that the GUI 116 is delayed, for any reason, then price update coalescing can occur by replacing the old price update with the new. The amount of coalescing becomes automatically balanced depending on the ability of the GUI thread to receive, process, and respond to its update message.

Coalescing of market depth data or any other types of market data happens in a very similar manner to that described above. Market data is delivered to the client device, and a different (or the same) shared data structure holds the coalesced data. The notification message used for each market data is preferably independent of each other. Thus, the GUI responds and handles individual sets of calls and notifications. This allows the user or application to implement client GUI thread pacing of market depth independent of that for inside market updates.

It should be understood that it is not necessary to know where the contents of the market data updates are stored to understand the present invention. In a preferred embodiment, the contents are stored into a data structure. According to the preferred embodiment, the contents of the market data updates are stored in separate data structures such as one data structure for the best bid price and quantity, best ask price and quantity, and other items of interest such as LTP, LTQ, and so on. Another data structure stores all of the market depth information for bids (bid prices and their corresponding quantities), while a third data structure stores all of the market depth information for asks (ask prices and their corresponding quantities). However, in another embodiment, this information may be stored only in one data structure (or accessible memory) or in many data structures, depending on how it is programmed.

CONCLUSION

The foregoing description is presented to enable one of ordinary skill in the art to make and use the invention. Various modifications to the preferred embodiment will be readily apparent to those skilled in the art and the generic principles herein may applied to other embodiments. Therefore, it should be understood that the above description of the preferred embodiments, alternative embodiments, and specific examples are given by way of illustration and not limitation. Many changes and modifications within the scope of the present embodiments may be made without departing from the spirit thereof, and the present invention includes all such changes and modifications.

I claim:

1. A method for coalescing market data at a client device, the method comprising the steps of:
   receiving by a client device in a first thread at a client device a first market data update for a tradeable object from an electronic exchange;
   storing by the client device the first market data update in a shared data structure, wherein the shared data structure is shared between the first thread and a second thread;
   notifying by the client device a graphical user interface running in the second thread of the first market data update;
   receiving by the client device in the first thread at the client device a second market data update for the tradeable object from the electronic exchange subsequent to the step of notifying;
   replacing by the client device the first market data update in the shared data structure with the second market data update before the first market update is received by the graphical user interface; and
   retrieving by the client device the second market data update from the shared data structure by the graphical user interface responsive to the step of notifying.

2. The method of claim 1, wherein the shared data structure includes a plurality of fields, wherein the first market data update is stored in one of the plurality of fields.

3. The method of claim 1, wherein the first thread is a communication thread.

4. The method of claim 1, wherein the second thread is a graphical user interface.

5. A method for coalescing market data, the method including:
   receiving by a client device at an API running in an API thread of the client device a first market data update for a tradeable object from an electronic exchange;
   storing by the client device the first market data update in a shared data structure, wherein the shared data structure is shared between at least the API thread and a graphical user interface thread, wherein the graphical user interface thread is running a graphical user interface for the client device;
   providing by the client device a notification to the graphical user interface that the shared data structure includes an update;
   receiving by the client device at the API running in the API thread at least one subsequent market data update for the tradeable object from an electronic exchange, wherein the subsequent market data update is received subsequent to providing the notification; and
   overwriting by the client device the first market data update with the at least one subsequent market data update before the first market update is received by the graphical user interface to create a coalesced market data update until the graphical user interface indicates to the API running in the API thread that the graphical user interface has retrieved the coalesced market data update responsive to the notification.

6. The method of claim 5, further including clearing the shared data structure after the graphical user interface has retrieved the coalesced market data update.

7. The method of claim 5, further including:
   receiving at the API running in the API thread a second market data update after the graphical user interface has retrieved the coalesced market data update;
   storing the second market data update in the shared data structure; and
   providing a second notification to the graphical user interface that the shared data structure includes a second update.

8. The method of claim 5, wherein the shared data structure includes a plurality of fields, wherein the first market data update and the at least one subsequent market data update are associated with one of the plurality of fields.

9. The method of claim 5, wherein the notification to the graphical user interface includes setting a flag.

10. The method of claim 5, wherein the notification to the graphical user interface includes placing a message in a message queue for the graphical user interface.

11. The method of claim 10, wherein a second notification is not sent to the graphical user interface if a pending notification is in the message queue for the graphical user interface.

12. The method of claim 5, wherein the first market data update and the at least one subsequent market data update are for a price of the tradeable object.

13. The method of claim 5, wherein the first market data update and the at least one subsequent market data update are for an order of the tradeable object.

14. The method of claim 5, wherein the first market data update and the at least one subsequent market data update are for a fill of the tradeable object.

15. The method of claim 5, wherein the first market data update and the at least one subsequent market data update are for a last traded price of the tradeable object.

16. The method of claim 5, wherein the first market data update and the at least one subsequent market data update are for a last traded quantity of the tradeable object.

17. The method of claim 5, wherein the first market data update and the at least one subsequent market data update are for an inside market of the tradeable object.

18. The method of claim 5, wherein the first market data update and the at least one subsequent market data update are for a settlement price of the tradeable object.

* * * * *